US006968130B1

(12) United States Patent
Pan

(10) Patent No.: US 6,968,130 B1
(45) Date of Patent: Nov. 22, 2005

(54) SYSTEM AND METHOD FOR FULLY UTILIZING AVAILABLE OPTICAL TRANSMISSION SPECTRUM IN OPTICAL NETWORKS

(75) Inventor: Jin-Yi Pan, Westford, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/390,910

(22) Filed: Sep. 7, 1999

(51) Int. Cl.[7] .......................... G02F 1/00; H04B 10/08; H04B 17/00
(52) U.S. Cl. .................. 398/5; 398/4; 398/12; 398/13; 398/19; 398/20
(58) Field of Search .............................. 398/1–5, 7, 12, 398/14, 20, 33, 34, 45, 50, 67, 68, 145, 59, 398/87, 56, 79, 6, 13, 19; 359/337.12

(56) References Cited

U.S. PATENT DOCUMENTS

| | | | | |
|---|---|---|---|---|
| 5,457,760 A | * | 10/1995 | Mizrahi ....................... 385/37 |
| 5,488,501 A | * | 1/1996 | Barnsley ...................... 398/51 |
| 5,760,934 A | * | 6/1998 | Sutter et al. .................. 398/59 |
| 5,771,112 A | * | 6/1998 | Hamel et al. ................. 398/83 |
| 5,793,745 A | * | 8/1998 | Manchester ................ 370/224 |
| 5,805,320 A | * | 9/1998 | Kuroyanagi et al. .......... 398/56 |
| 5,933,258 A | * | 8/1999 | Flanagan et al. ............... 398/5 |
| 5,937,116 A | * | 8/1999 | Seto ............................ 385/24 |
| 5,940,197 A | * | 8/1999 | Ryu ............................ 398/83 |
| 5,974,027 A | * | 10/1999 | Chapman .................... 370/228 |
| 5,995,256 A | * | 11/1999 | Fee .............................. 398/34 |
| 6,014,237 A | * | 1/2000 | Abeles et al. ................. 398/87 |
| 6,038,044 A | * | 3/2000 | Fee et al. ...................... 398/56 |
| 6,046,832 A | * | 4/2000 | Fishman ....................... 398/45 |
| 6,104,527 A | * | 8/2000 | Yang ..................... 359/341.33 |
| 6,130,764 A | * | 10/2000 | Taniguchi ....................... 398/1 |
| 6,151,160 A | * | 11/2000 | Ma et al. ............... 359/337.12 |
| 6,201,907 B1 | * | 3/2001 | Farries ........................ 385/24 |
| 6,222,653 B1 | * | 4/2001 | Asahi ............................. 398/4 |
| 6,226,111 B1 | * | 5/2001 | Chang et al. ................... 398/9 |
| 6,266,168 B1 | * | 7/2001 | Denkin et al. .................. 398/5 |
| 6,272,154 B1 | * | 8/2001 | Bala et al. ................... 370/535 |

(Continued)

OTHER PUBLICATIONS

"Highly stable Optical Add/Drop Multiplexer using Polarization Beam Splitters and Fiber Bragg Gratings", internet site located at http://161.122.12.144/research/adddrop.html, 4 pages, date printed: Aug. 17, 1999.

(Continued)

Primary Examiner—M. R. Sedighian
(74) Attorney, Agent, or Firm—Squire, Sanders & Dempsey LLP

(57) ABSTRACT

A system and method for facilitating full utilization of an ultra-wide optical communication band spanning the useable band of the optical transmission spectrum, and providing appropriate protection strategies on the same mesh/ring network for all channels within the ultra-wide optical communication band. A network node architecture includes a band splitter to receive all of the optical signals sent on various wavelengths within the wide optical communication band. The band splitter separates a first group of the optical signals from a second group of the optical signals based on their range of wavelength. The first group of optical signals are those within a first wavelength range of the optical communication band, and the second group is from the second wavelength range of the optical communication band. A cross-connect circuit receives the first and second groups of optical signals, and routes them to targeted output ports at the output section of the node. The first and second groups of optical signals are combined by a band combiner into an aggregate plurality of optical signals to be collectively transmitted from the network node.

33 Claims, 6 Drawing Sheets

U.S. PATENT DOCUMENTS

| | | | |
|---|---|---|---|
| 6,278,536 B1 * | 8/2001 | Kai et al. ..................... | 398/79 |
| 6,285,479 B1 * | 9/2001 | Okazaki et al. ............... | 398/56 |
| 6,351,323 B1 * | 2/2002 | Onaka et al. .................. | 398/84 |
| 6,504,638 B1 * | 1/2003 | Tanaka et al. ................. | 398/97 |
| 6,567,194 B1 * | 5/2003 | Badr ............................. | 398/1 |
| 6,567,196 B1 * | 5/2003 | Archambault ................. | 398/79 |
| 6,570,685 B1 * | 5/2003 | Fujita et al. ................... | 398/79 |
| 6,580,530 B1 * | 6/2003 | Arecco et al. ................. | 398/5 |
| 6,602,002 B1 * | 8/2003 | Srivastava et al. ........... | 398/113 |
| 6,631,018 B1 * | 10/2003 | Milton et al. ................. | 398/59 |
| 6,643,041 B1 * | 11/2003 | Ikeda et al. ................... | 398/79 |
| 6,768,578 B1 * | 7/2004 | Kinoshita et al. ............ | 359/337 |

OTHER PUBLICATIONS

"DWDM Channel Spacing Do You Know How Much Capacity You're Really Getting?", internet site located at http://www.usa.alcatel.com/telecom/transpt/optical/techpaps/ad9804.htm, 8 pages, date printed: Aug. 12, 1999.

"Today's Optical Amplifier—The Cornerstone of Tomorrow's Optical Layer", Thomas Fuerst, internet site located at http://www.usa.alcatel.com/telecom/transpt/optical/techpaps/opt_amp/opt_amp.htm, 12 pages, date printed: Aug. 12, 1999.

"Migration to All Optical Networks", Tim Krause, internet site located at http://www.usa.alcatel.com/telecom/transpt/optical/techpaps/migration/migration.htm, 7 pages, date printed: Aug. 12, 1999.

"Need + Promise = Challenge!", internet site located at http://networks.cs.ucdavis.edu/users/mukherje/book/ch01/node2.html, 2 pages, date printed: Aug. 5, 1999.

"xDM vs. xDMA", internet site located at http://networks.cs.ucdavis.edu/users/mukherje/book/ch01/node3.html, 1 page, date printed: Aug. 5, 1999.

"Wavelength-Division Multiplexing (WDM)", internet site located at http://networks.cs.ucdavis.edu/users/mukherje/book/ch01/node4.html, 3 pages, date printed: Aug. 5, 1999.

"WDM Networking Evolution", internet site located at http://networks.cs.ucdavis.edu/users/mukherje/book/ch01/node5.html, 3 pages, date printed: Aug. 5, 1999.

"WDM Network Constructions", internet site located at http://networks.cs.ucdavis.edu/users/mukherje/book/ch01/node6.html, 3 pages, date printed: Aug. 5, 1999.

"Wavelength Division Multiplexing", internet site located at http://opt-fibres.phys.polymtl.ca/Fibers_html/node32.html, 1 page, date printed: Aug. 5, 1999.

"WDM for 1300 and 1550 nm wavelengths", internet site located at http://opt-fibres.phys.polymtl.ca/Fibers_html/node33.html, 2 pages, date printed: Aug. 5, 1999.

"Dense WDM", internet site located at http://opt.fibers.phys.polymtl.ca/Fibers_html/node35.html, 1 page, date printed: Aug. 5, 1999.

"Dimensioning of Survivable WDM Networks", Caenegem et al., ISAC IEEE, Sep. 1998.

"Some Principles for Designing a Wide-Area Optical Network," Mukherjee et al., in Pro. IEEE INFOCOM'94, Jun. 1994.

"Large-Capacity Optical Path Cross-Connect System for WDM Photonic Transport Network," Masafumi Koga et al., JSAC IEEE, Sep. 1994.

* cited by examiner

SYSTEM AND METHOD FOR FULLY UTILIZING AVAILABLE OPTICAL TRANSMISSION SPECTRUM IN OPTICAL NETWORKS

FIELD OF THE INVENTION

The present invention relates generally to network communications systems, and more particularly, to a method and apparatus for facilitating full utilization of a wide optical communication band including channels which are both available and unavailable for optical amplification.

BACKGROUND OF THE INVENTION

The modern communications era has brought about a tremendous proliferation of wireline and wireless networks. Computer networks, television networks, and telephony networks in particular are experiencing an unprecedented technological expansion, fueled by consumer demand. The ever-increasing need for bandwidth has exceeded even the most perspicacious expectations, as the explosion of data and multimedia transmissions are breaking the seams of the networking infrastructure. This has propelled a fervent effort to quickly increase the available communications bandwidth.

In line with this effort, various data transmission technologies have been employed and improved upon. Improved networking architectures and protocols over copper wires, radio waves and fiber-optic cable are helping in the effort to increase available bandwidth. Of late, optical data communication over the fiber-optic infrastructure is proving to be one of the most promising areas to assist in this effort. The fiber-optic cabling laid over the last couple of decades have traditionally been underused with respect to bandwidth. Essentially, this has been due to the failure to multiplex signals on a given fiber. For example, the first major use of optical fiber was a single-mode use where a single signal is transmitted through the fiber. In this mode, service providers quickly experience fiber exhaustion such that bandwidth can no longer be increased unless more fibers are installed.

Efforts have now turned to modulation techniques used to transmit the optical signals. In order to increase bandwidth, wavelength division multiplexing (WDM) has been used to allow multiple signals to travel along a single fiber. Wavelength division multiplexing (WDM) is a technique where multiple signals having different wavelengths are launched on the same fiber and demultiplexed at the receiving end. Each optical signal is assigned to a frequency (wavelength) within a designated frequency band, and the individual signals are multiplexed onto a single fiber where they can be collectively amplified. The first such use was to allow two different signals at two different wavelengths to travel along a fiber, which essentially doubled the bandwidth available for each fiber. The original two-wavelength mode communicated optical signals at about 1300 nm and 1550 nm. This additional bandwidth, while beneficial, was very quickly devoured by the unforeseeably immense demand for bandwidth. It became apparent that further increases in bandwidth capacity would be necessary.

It was determined that single-fiber bandwidth could be increased by further increasing the number of wavelength-modulated signals transmitted through the fiber. This effort has had some success using WDM technology, and is generally referred to as dense WDM (DWDM). However, dense multiplexing techniques for smaller wavelength spacings are more difficult to manufacture. Further, the current thrust is the realization of true optical networking. Such a network utilizes optical cross-connects and amplifiers to transmit optical signals over long distances without the need for electrical regeneration. More particularly, the Erbium-doped fiber amplifier (EDFA) allows for direct amplification of an optical signal without the need for intermediate electronic circuitry. EDFAs are pieces of optical fibers doped with the rare earth element erbium, an element that passively amplifies light in the 1550 nm region when pumped by an external light source. However, commercially-available EDFAs operate in a specific frequency band, and do take advantage of the entire optical communication band.

Current networks incorporating optical transmission are not necessarily fully-optical networks, and incorporate SONET (Synchronous Optical NETwork) or SDH (Synchronous Digital Hierarchy) nodes. Point-to-point data transfers may be made via fiber, but switching and/or amplifying functions are performed using digital switching and amplification technologies. Therefore, data networks employing optical transmission may also be required to operate in connection with existing electronic switching nodes.

Protection strategies over WDM networks is also an important consideration. Network resilience is important to account for cable breaks or other impairments to fiber-optic communication. This is often accomplished by reserving a portion of the fibers in a particular configuration for restoration in the event of a working channel failure. For example, in a four-fiber bidirectional line-switched ring, half of the ring's capacity is reserved for optical survivability. Such protection is available for various network architectures, such as linear or optical ring architectures.

In view of the many considerations that must be accounted for in such networks, the challenge still remains to maximize the bandwidth and fully utilize the optical communications band. There is a need in the communications industry for a network node architecture that fully utilizes the optical communications band while providing various protections on the same mesh/ring network. The present invention provides a solution to these and other shortcomings of the prior art, and offers additional advantages over the prior art.

SUMMARY OF THE INVENTION

The present invention is directed to a system and method for facilitating full utilization of an ultra-wide optical communication band spanning the useable band of the optical transmission spectrum, while providing appropriate protection strategies on the same mesh/ring network for all channels within the ultra-wide optical communication band.

In accordance with one embodiment of the present invention, a network node architecture is provided for use in wavelength division multiplexing (WDM) optical networks. The node architecture allows full utilization of a wide optical communication band. The node architecture includes a band splitter to receive all of the optical signals sent on various wavelengths or "channels" within the wide optical communication band. The band splitter separates a first group of the optical signals from a second group of the optical signals based on their range of wavelength. The first group of optical signals are those within a first wavelength range of the optical communication band, and the second group is from the second wavelength range of the optical communication band. Each of the first and second wavelength ranges may include non-contiguous wavelength ranges. The node architecture also includes a cross-connect circuit to receive the first and second groups of optical signals, and to route these signals to targeted output ports at the output section of the node. Before being transmitted by the node, the first and second groups of optical signals are combined by a band combiner into an aggregate plurality of optical signals to be collectively transmitted from the network node.

In more specific embodiments of the network node architecture, the first group of optical signals corresponds approximately to the range of wavelengths capable of being optically amplified, such as by erbium-doped fiber amplifiers. These optical signals within the first group are amplified as needed, and optical signals in the second group are not amplified. Ring protection is afforded those signals within the first group of optical signals, and less distance-intensive protection is provided for those signals in the second group of optical signals, such as a linear protection strategy. The first and second groups of optical signals can be split using long period fiber Bragg grating having a Bragg resonance wavelength band substantially equal to the optical amplification wavelength range to reflect the first group of optical signals onto a first signal path, while allowing the optical signals within the second wavelength range to pass through the long period fiber Bragg grating to a second signal path. The signals can be combined using a long period fiber Bragg grating having a Bragg resonance wavelength band substantially equal to the optical amplification wavelength range to reflect the first group of optical signals onto a common path and to pass the second group of optical signals onto the common path such that the first and second group of optical signals are collectively combined on the common signal path to allow transmission of all of the optical signals from the node via the common path.

In accordance with another aspect of the invention, a method for fully utilizing an optical spectrum spanning a predefined low-attenuation region of an optical transmission spectrum is provided, for use in communicating information on optical fibers of an optical network. The method includes separating optical signals within the predefined low-attenuation region into in-band and out-band optical signals, where the in-band signals substantially correspond to a first wavelength range within the predefined low-attenuation region designated for optical amplification. The out-band signals substantially correspond to a second wavelength range within the predefined low-attenuation region and exclusive of the first wavelength range. The in-band and out-band optical signals are routed to in-band and out-band output ports associated with destination nodes for the in-band and out-band signals respectively. The in-band and out-band optical signals from the in-band and out-band output ports are combined to provide a united collection of the optical signals for collective transmission from the node.

The above summary of the present invention is not intended to describe each illustrated embodiment or implementation of the present invention. This is the purpose of the figures and the associated discussion which follows.

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is directed to a system and method for maximizing exploitation of the total 50 THz optical communication band, while providing multiple types of protection strategies on the same mesh/ring network, such as OMS-SPRING and OCH-SNCP protection strategies. Optical signals within a first predetermined band, such as an EDFA band, are separated from optical signals within a second predetermined band, such as the remaining channels within the approximately 50 THz low-attenuation region of the optical transmission spectrum. These "in-band" and "out-band" signals are cross-connected, and may be supplemented by other added signals, or depleted by signal dropping. The in-band signals, where corresponding to the EDFA band, can be amplified, and therefore may be protected by ring protection strategies such as OMS-SPRING. The out-band signals are not optically amplified, and cannot be transmitted for long distances. For example, distances longer than approximately 80 km–100 km require amplification, and furthermore optical cross-connect attenuation can further weaken transmission distances. Therefore, the out-band signals are protected using other protection strategies, such as a linear protection strategy. Before the in-band and out-band signals are transmitted from the node, they are recombined in order to allow all of the signals to be transmitted on a single fiber.

Figure 1:
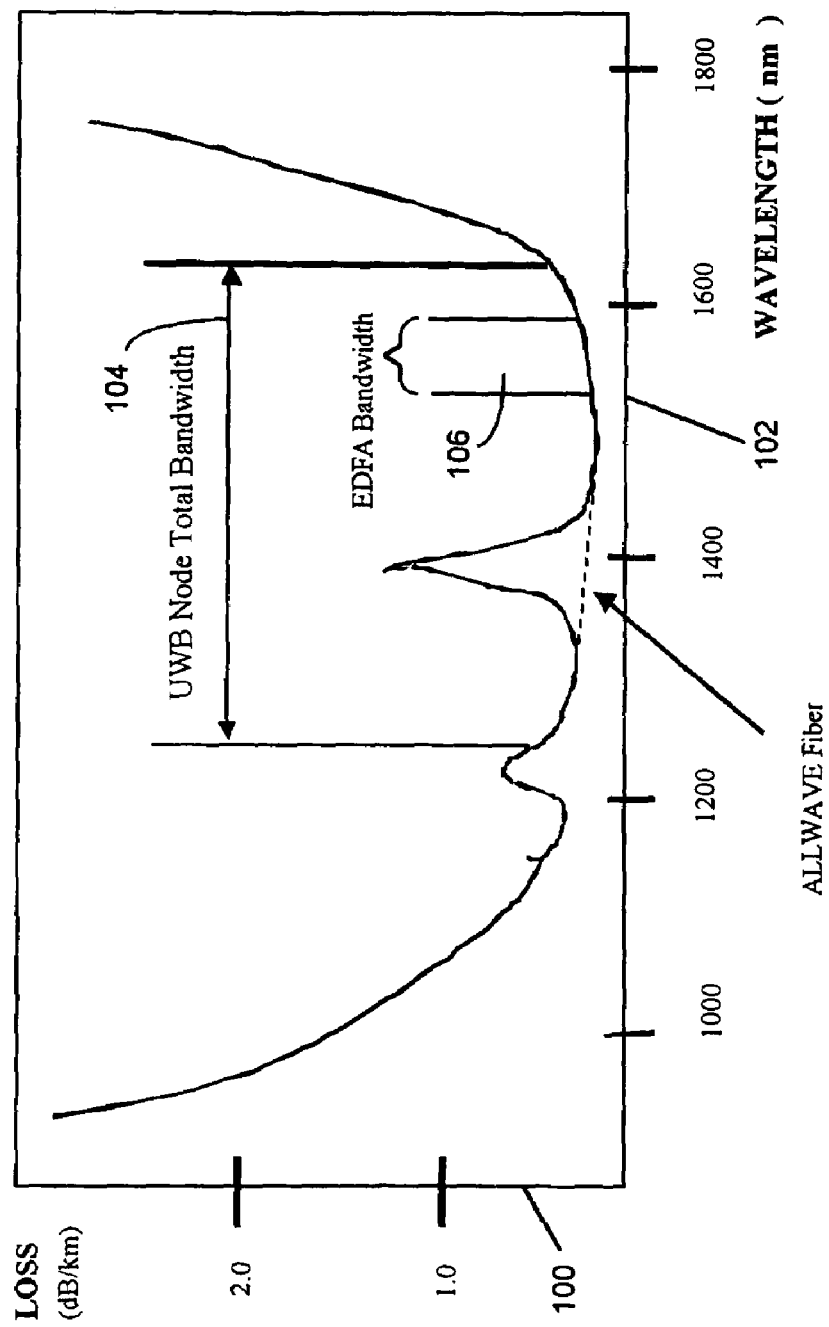
FIG. 1 is a waveform diagram approximately illustrating the low-attenuation region of the optical transmission spectrum.

Within the optical transmission spectrum, there is a region that exhibits very low attenuation characteristics. It is within this region that optical transmission is most desirable. FIG. 1 graphically illustrates this region. The loss (dB/km) is shown on the vertical axis 100, and the wavelength in nanometers is provided on the horizontal axis 102. The optical transmission attenuation is very low in the range of approximately 1240 nm to 1610 nm, termed in FIG. 1 as the UWB band 104 which represents the wavelengths having characteristics that facilitate optical transmission. This wavelength range can accommodate approximately 925 channels with 50 GHz channel spacing. It would be desirable to utilize as many channels within this band 104 as possible to increase the overall bandwidth of a connection.

Within the UWB band 104 is a wavelength band 106 that illustrates the approximate EDFA bandwidth. Commercially-available erbium-doped amplifiers have various wavelength ranges, starting at approximately 1520 nm up to approximately 1610 nm. As can be seen in FIG. 1, the EDFA bandwidth 106 is only a subset of the available UWB band 104. The present invention provides a node architecture for ultra-wide band wavelength division multiplexing networks that allows network operators to fully use the total 50 terahertz (THz) optical communication band 106, thereby accommodating up to 1000 WDM channels while providing both OMS-SPRING and OCH-SNCP protections on the same mesh/ring network. The node architecture of the present invention is particularly applicable in metropolitan and regional area networks, although not limited thereto.

As will be appreciated by those skilled in the art from the description provided herein, the wavelength splitting and combination aspects of the present invention are applicable to other selected wavelength regions. For example, the principles of the present invention may be applied to greater than two wavelength bands, and may be applied to wavelengths outside of the ranges illustrated in FIG. 1. Examples in which the present invention is applicable may be described in terms of the UWB band 104 and its separation from the EDFA band 106, as the present invention is particularly useful in connection with these channel bands. This, however, is generally due to the physical characteristics and attenuation attributes of commercial fiber and available optical amplifiers, and the present invention is not limited to these particular channel bands. Different fiber characteristics exhibiting different attenuation attributes may provide favorable attenuation regions in different wavelength ranges. Similarly, optical amplification that is operable in other wavelength bands may provide for a different in-band region. The present invention is also applicable in these instances, as the band splitters and combiners can be configured to the particular channel bands desired. Therefore, while the description provided herein is provided in terms of the UWB band 104 and the EDFA band 106, the invention is clearly not limited thereto.

Figure 2:
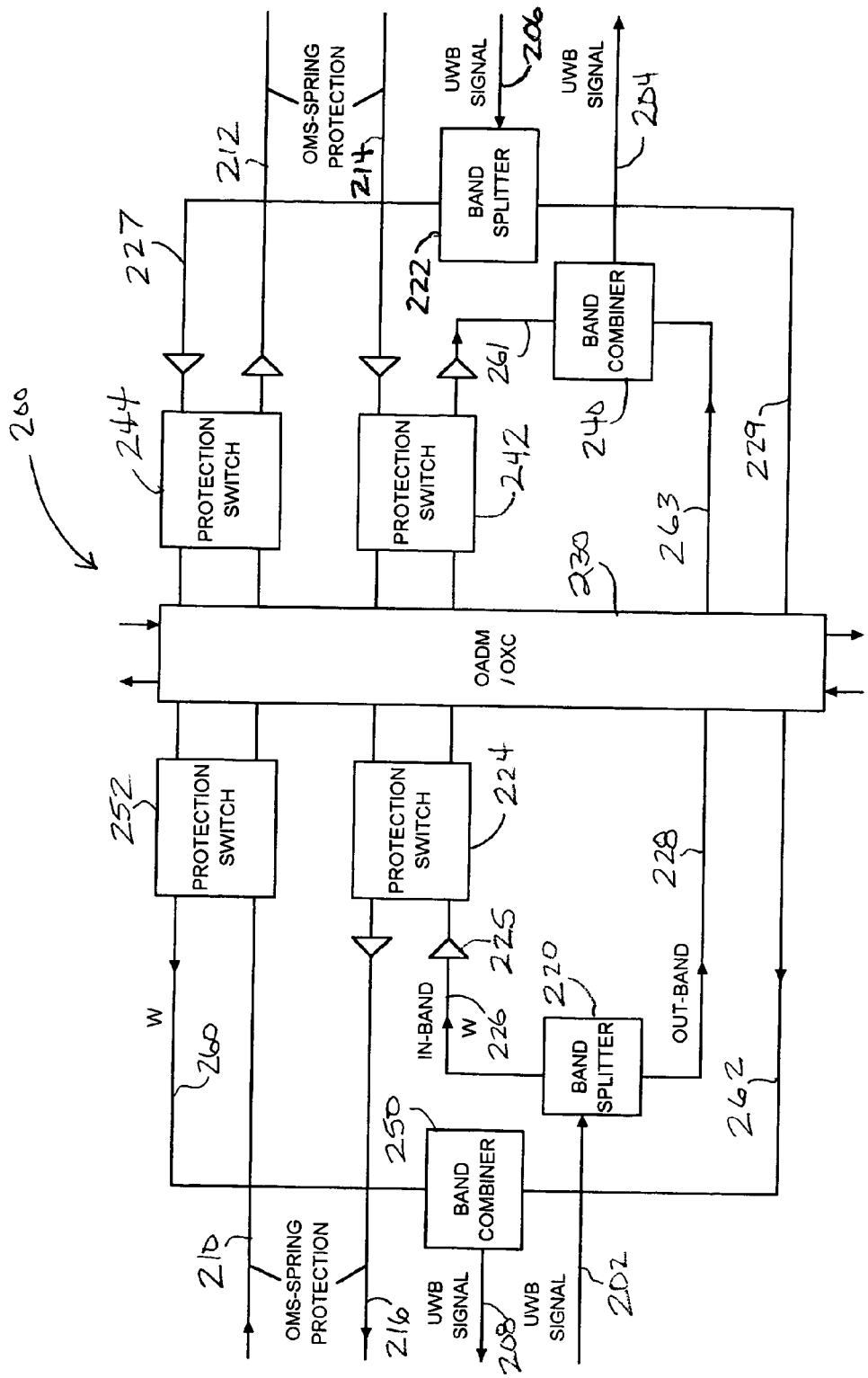
FIG. 2 is a block diagram illustrating one embodiment of a generic ultra-wide band (UWB) node architecture in accordance with the present invention.

FIG. 2 is a block diagram illustrating one embodiment of a generic ultra-wide band (UWB) node architecture 200 in accordance with the present invention. The exemplary node 200 represents a UWB WDM node in a network, such as a metropolitan or regional network. As will be detailed more fully below, the UWB node 200 of the present invention separates the UWB signals into multiple groups. In the example of FIG. 2, the UWB signals are separated into two groups: a first group referred to as the "in-band" signals that are within the EDFA amplification bandwidth, and the "out-band" signals which are the signals occupying the rest of the low-attenuation UWB band 106 which are outside of the EDFA amplification band. The in-band signals within the EDFA band can be amplified by commercially-available erbium-doped fiber amplifiers for longer distance transmission.

The UWB node 200 of FIG. 2 is a bidirectional node allowing signals to enter and exit from either side of the node. The node 200 may be connected to other nodes by four fibers, two of which are working fibers and two are protection fibers. The working fibers are labeled UWB signals, shown on lines 202, 204, 206 and 208. The working fibers 202 and 204 represent signals passing through the node 200 from the left to right as illustrated in FIG. 2, and working fibers 206 and 208 represent signals passing through the node 200 from the right to left. The protection fibers are labeled OMS-SPRING protection fibers, shown on lines 210, 212, 214 and 216. The node 200 can be connected to another node via the four fibers 202, 208, 210 and 216, and may be connected to another node via the four fibers 204, 206, 212 and 214. Each working fiber contains all of the applicable UWB wavelengths.

In accordance with the present invention, the incoming UWB signal is split into two bands, namely the "in-band" and "out-band" signals. This is performed by the band splitters 220 and 222. In one embodiment of the invention, the band splitter 220, 222 separates the aggregate UWB signal into the in-band and out-band signals, where the in-band signals are those signals having wavelengths associated with the EDFA amplification bandwidth, and the out-band signals are those signals having wavelengths outside of the EDFA bandwidth. Referring briefly to FIG. 1, the in-band signals are those associated with the EDFA bandwidth 106, and the out-band signals are all remaining signals in the UWB band 104, exclusive of the EDFA bandwidth 106.

Separating the in-band and out-band signals allows the entire UWB band 104 to be utilized. Signals that are to be transmitted long distances, thereby requiring amplification, can be transmitted in the EDFA band 106 such that passive commercially-available erbium-doped amplifiers can be used to amplify those signals. Other signals between nodes within the metropolitan or regional area network may not require amplification due to shorter transmission distances. Signals traveling shorter distances can be transmitted on wavelengths outside of the EDFA band 106, thereby increasing the total available bandwidth in the system. Further, where applicable, signals outside of the EDFA band 106 may be amplified by other means, as in SONET (Synchronous Optical NETwork) and SDH (Synchronous Digital Hierarchy) systems that use electrical regeneration.

Optical protection schemes are used to provide restoration of an optical link that has failed, for example, due to a fiber break. The type of optical protection scheme used depends on the type of network architecture implemented. Linear structures, including one or more point-to-point WDM connections, as well as WDM ring structures are common types of network structures associated with WDM transmission technology.

In linear or point-to-point systems, the associated protection scheme monitors for a fault on the line, such as the loss of a signal. When this occurs, signals transmitted on the working line are switched so that they travel along a backup or "protection" line. For linear architectures, this can be done in a variety of ways, including 1+1 or 1:1 protection schemes. A 1+1 protection typically refers to an automatic protection switch based on pairing one working link with one backup link. The signal is transmitted in parallel on both links so that if the working link fails, the receiver node switches the connection from working to backup. A 1:1 protection refers to an automatic protection switch that is also based on a working link with a backup link, but signals are not transmitted on both links in parallel. Rather, the signals are not transmitted on the backup link unless the working link fails, in which case both the transmitter side and receiver side switch the connection from the working link to the backup link. Protection for point-to-point connections is often referred to as "sub-network connection protection" (SNCP) because it is performed at the channel or link level, and not at the network level.

These types of protection are generally used for linear topologies, but may not be acceptable for other network structures such as ring or mesh topologies. While a particular point-to-point transmission may be protected using linear protection techniques, traffic adds or drops at an intermediate point along the point-to-point link is not protected. Therefore, ring and mesh topologies will require a different protection strategy, such as a self-healing ring technique. This may be accomplished by reversing the direction of the signal in the ring where a fault has been detected, either on the same line or switching the signal from the working line to a backup line. The signal will then travel around the ring and enter the target node from the opposite side.

In FIG. 2, the in-band signals from the band splitter 220 are bridged by an optical 2×2 switch 224 for OMS-SPRING protection. In accordance with the present invention, the in-band signals are bound together within a fiber, and one optical switch can be used to collectively switch the contents of all of the in-band signals. Because the in-band signals can be amplified and switched together, the in-band signals can be transmitted on a ring(s) of the network. If a failure occurs on a link of the ring, such as a fiber break or other transmission impediment, all of the in-band signals can be collectively switched to a protection fiber by one or more protection switches, such as protection switch 224. The multiplexed in-band signals can therefore be switched over the fiber and rerouted in a reverse direction on the ring on a ring protection fiber to ultimately be switched back to the working fiber, and thereby ultimately reach the destination node. Rerouting the signals on a protection fiber of a ring may result in a long transmission distance on the protection fiber around the ring, and therefore it is appropriate to use an optical ring protection for the in-band signals since these signals can be optically amplified and can continue to be transmitted on the ring. Therefore, in one embodiment of the invention, the in-band signals are protected using OMS-SPRING (optical multiplexer section shared protection ring) technologies.

For the out-band signals, automatic protection switching that does not require rerouting via the ring protection fibers is used, such as a linear protection scheme. In one embodiment of the invention, a 1+1 protection scheme is used. This protection scheme is applicable for the out-band signals because all of the channels (i.e., wavelengths) of the out-band signals are available individually, and because the out-band signals are not optically amplified, minimizing the transmission distance is desirable. In these cases, each out-band signal to be transmitted is sent on two different wavelengths and are split into two different paths at a node to provide two different paths to the receiver node. The receiver node selects the appropriate one of the two transmitted signals. This provides the protection for the out-band signals, and allows the out-band signals to be protected without having to use ring protection strategies that can require longer transmission distances. While in one embodiment of the invention a 1+1 protection strategy is used for out-band signal protection, other direct protection schemes for use in connection with the out-band signals may also or alternatively be used, such as other linear or signaling protection schemes.

Referring again to FIG. 2, the in-band signals are amplified by EDFA 225, and connected to the optical add/drop multiplexer and/or optical cross-connect (OADM/OXC) 230. The out-band signals from the band splitter 220 can be directly connected to the OADM/OXC 230. The OADM/OXC 230 allows signals to be added, dropped, by-passed and cross-connected in the node 200. Generally, the optical cross-connect (OXC) accepts various wavelengths on input ports and routes them to the appropriate output ports. The OXC may route all of the wavelengths on an incoming fiber to a different fiber, or may switch specific wavelengths from an input fiber to multiple output fibers. The OXC can also convert incoming wavelengths to other optical wavelengths on the outgoing port where necessary.

Assuming no faulty node or fiber conditions, a UWB signal shown on line 202 enters the band splitter 220, where the in-band and out-band signals are separated. The in-band signals 226 to continue through node 200 are routed to the protection switch 224, amplified by EDFAs, and directed to the band combiner 240. An optical protection switch 242 may be used to bridge the in-band signal 261 at the output of the OADM/OXC 230 if desired. Meanwhile, the out-band signals 228 from the band splitter 220 to continue through the node 200 are routed directly to the OADM/OXC 230 and directed to the band combiner 240. The band combiner 240 recombines the in-band signal 261 and out-band signal 263 so that an aggregate of the in-band and out-band signals can be transmitted as the UWB signal shown on line 204.

Operation is analogous for UWB signals input on line 206 to the band splitter 222. The in-band signals 229 are routed to the protection switch 244, amplified by EDFAs, and directed to the band combiner 250. An optical protection switch 252 may be used to bridge the in-band signal 260 at the output of the OADM/OXC 230 if desired. The out-band signals 229 from the band splitter 222 are routed directly to the OADM/OXC 230 and directed to the band combiner 250, which recombines the in-band signals 260 and the out-band signals 262 so that an aggregate of the in-band and out-band signals can be transmitted as the UWB signal shown on line 208.

In the event of a fiber or node failure, the in-band signals are OMS-SPRING protected. If there is a fiber cut or node malfunction, the in-band signals will be switched to the protection fiber by the optic switch prior to the failure. The in-band signals will be looped back to the other side of the failure through the ring and amplifiers. The out-band signals can be protected in a linear fashion, such as 1+1 OCH (optical channel) layer protected. Alternatively, the out-band signals can be afforded no protection if desired.

For example, assume that the UWB signal on line 202 is split into in-band and out-band signals, and the in-band signals are optically cross-connected via OADM/OXC 230. Further assume that a fiber break has occurred at some point on the UWB signal link on line 204. The in-band signals will be switched by the ring protection switch 242 to re-enter the OADM/OXC 230, and will be switched onto the OMS-SPRING protection fiber 216 by protection switch 224. This results in the aggregate in-band signals being collectively switched onto the protection fiber 216, where it is sent back in the opposite direction around the ring. In order to get the in-band signals back onto the working path (W), the receiving node will perform a switch operation to switch the in-band signals from the protection fiber back to the working fiber. This can also be illustrated by example in the diagram of FIG. 2. Where node 200 represents a receiving node and a fiber break has made it impossible for UWB signals to enter the node via line 206 UWB signals, node 200 will receive in-band signals from the other side of the node via the protection fibers. For example, via protection fiber 210. The in-band signals will enter the protection switch 252, cross-connect to protection switch 244, and cross-connect back to protection switch 252 where the in-band signals are switched back onto the working fiber (W). Once back on the working fiber, the in-band signals can again be combined with the out-band signals at the band combiner 250, and sent back onto the ring as the UWB signal on line 208.

The out-band signals do not, however, use the OMS-SPRING protection fibers 210, 212, 214, 216. Instead, the information in each unamplified signal of the out-band is duplicated and sent in different directions along the working paths of the ring, preferably on different wavelengths. For example, the out-band signals from band splitter 220 and other added out-band signals may be sent on different channels on both the working path on line 204 and the working path on line 208 after being combined with the in-band signals by band combiners 240, 250 respectively. Each of these paths reach a targeted receiving node, and the receiving node selects which of the redundant information signals to use. If a fiber break or other failure occurs causing one of the out-band links to fail to reach the receiving node, the other out-band link will supply the signal. An example of the protection strategy in a network ring topology in accordance with the present invention is set forth in FIG. 3 below.

Figure 3:
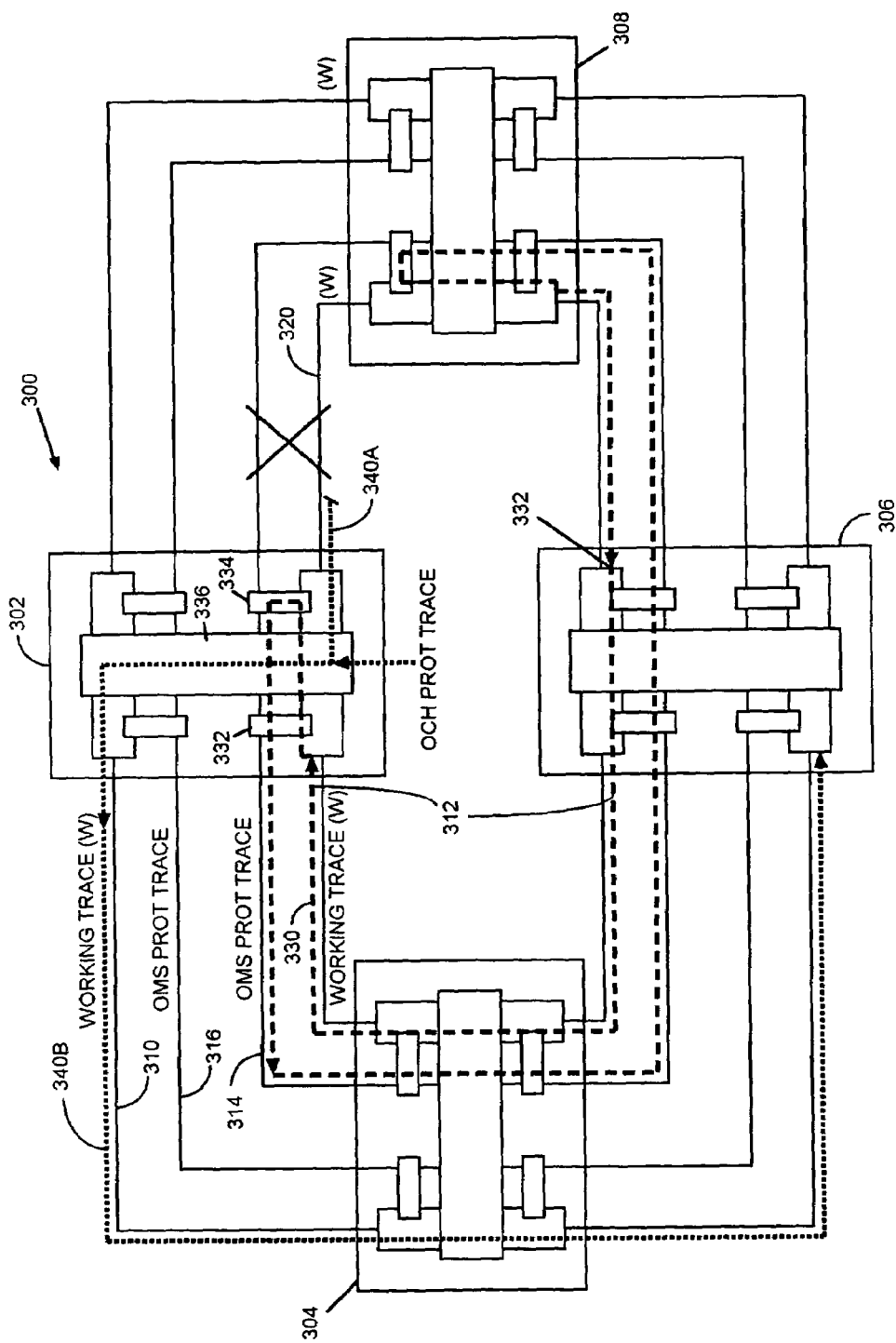
FIG. 3 illustrates an example of a UWB ring topology using SNCP and MS-SPRING protection in accordance with the present invention.

FIG. 3 illustrates an example of a UWB ring topology using SNCP and MS-SPRING protection in accordance with the present invention. The example ring network 300 includes four network nodes, including nodes 302, 304, 306 and 308. Each of the nodes is provided in the manner described in connection with FIG. 2. Each node in the ring 300 is connected to another node by four fibers, in which two are working fibers and two are protection fibers. The working fibers (W) are shown on lines 310 and 312, and the OMS protection fibers are shown on lines 314 and 316.

In the example of FIG. 3, it is assumed that a fiber break has occurred that has caused a link failure on the working fiber 320 between nodes 302 and 308. In such a case, the in-band signals will no longer follow the same ring path as was followed prior to the fiber break, but instead will follow a path comprising a portion of the working fiber 312 and a portion of the OMS protection trace 314. This newly formed ring will connect nodes 302, 304 and 306 in a ring using the protection fiber. For example, for a UWB signal having the in-band signals separated from the out-band signals at node 302, the in-band signals will follow the path as depicted by dashed line 330. The in-band signals are split from the out-band signals at node 302, and are routed back through protection switches 332, 334 and OADM/OXC 336 to reroute the in-band signals along the OMS protection trace 314. The in-band signals will follow this dashed path 330 until they are switched back onto the working path and reach their destination. For example, in-band signals routed back from node 302 follow the OMS protection trace 314 until they reach node 308, where they are switched back to the working path. Assuming that node 306 was the receiving node, the in-band signals would reach the receiving node 306 via the working path 312 as shown at point, and the in-band signals will be cross-connected and recombined with the appropriate out-band signals at node 306. If there had been no fiber cut on link 320, the in-band and out-band signals could have been combined at node 302 and transmitted along the working path towards node 308.

The separated out-band signals, as well as other out-band signals added at a particular node, have a different protection path. This is illustrated by the OCH protection trace in FIG. 3. The OCH protection trace is used for out-band signals split from the in-band signals, as well as other out-band signals entering the particular node. For example, the OCH protection trace in FIG. 3 is illustrated by an out-band path split into two paths that follow the two working paths leaving node 302, represented by dashed lines 340A and 340B. The information from each out-band channel is duplicated in two wavelengths and provided on the working paths 310 and 320, again as illustrated by dashed lines 340A and 340B. When out-band signals split from working path 312, and/or out-band signals are added at the node 302, they therefore follow both working paths 310 and 320. If there is a working path fiber break, such as a break in the working link 320, the out-band signals will still reach their destination via the other working path, which is working path 310 in this example. For example, an out-band signal at node 302 destined for node 306 will encounter the failure of working node 320, but the out-band signal will still follow working path 310 to node 306 as illustrated by dashed line 340B. If, working trace 310 were to break/fail rather than working trace 320, the out-band signals would arrive at their destination by following the path represented by dashed line 340A until it reached node 306. In either case, when the out-band signals are provided on the working path, they are combined using band combiners (e.g., band combiner 350 of FIG. 2) with any in-band signals being output from node 302 via working trace 310. Therefore, protection for out-band signals can be incorporated into the links of the ring network, and all of the in-band and out-band of the UWB band 104 can be used and protected.

As can be seen from the foregoing examples in FIGS. 2 and 3, the present invention splits in-band and out-band signals, provides protection for each in-band and out-band signal group, and provides for the appropriate recombination of signals in the UWB band, to allow for full utilization of the UWB band while providing necessary protection against fiber breaks and other failures. In this manner, both ring protections (e.g., OMS-SPRING) for in-band signals and linear protections (e.g., 1+1 OCH-SNCP) for out-band signals can be provided on the same mesh/ring network.

Figure 4:
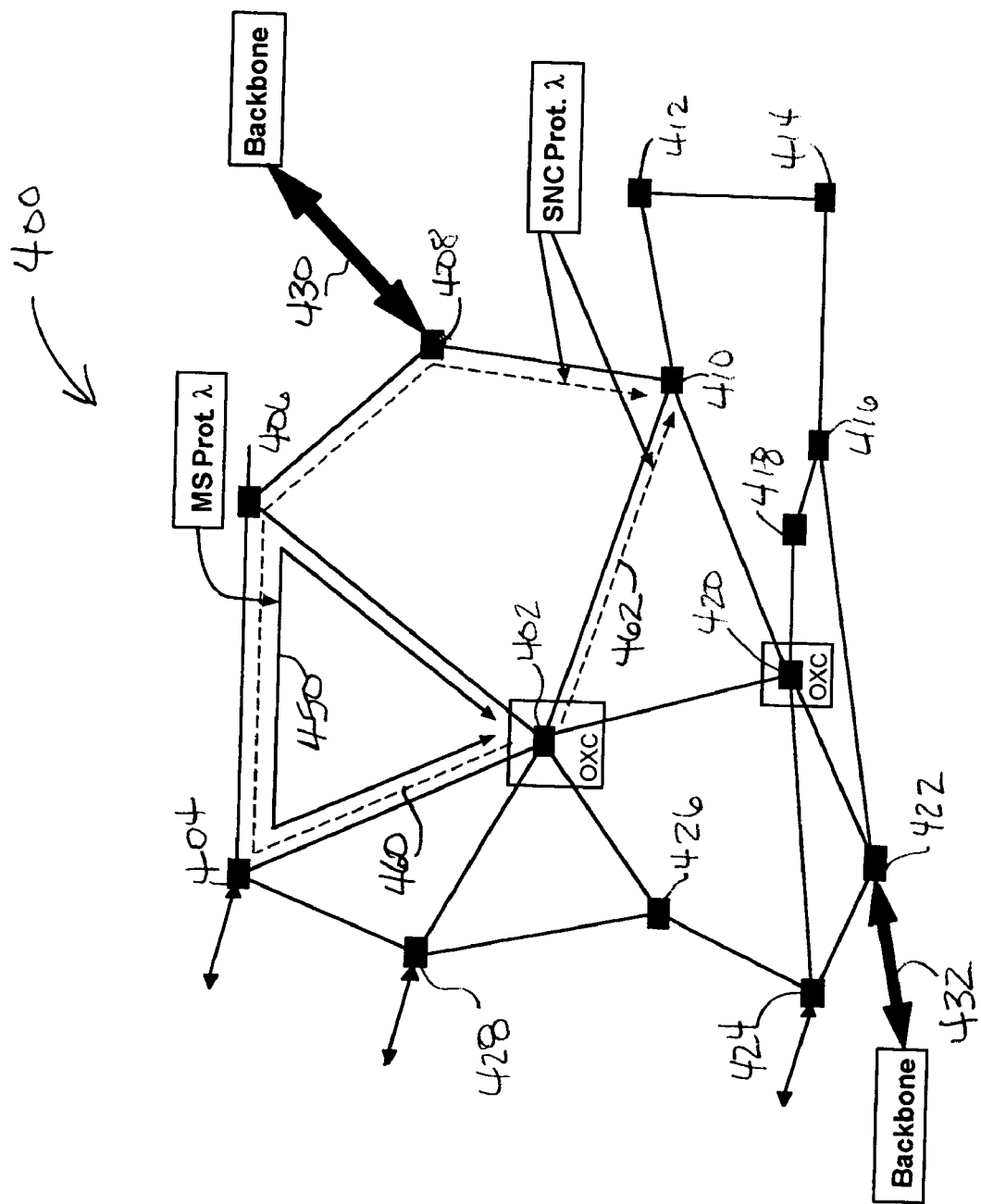
FIG. 4 illustrates an example of a mesh topology using SNCP and MS-SPRING protection in accordance with the present invention.

FIG. 4 illustrates an example of a mesh topology using SNCP and MS-SPRING protection in accordance with the present invention. The example mesh network 400 of FIG. 4 illustrates a mesh topology having a plurality of nodes identified by reference numerals 402, 404, 406, 408, 410, 412, 414, 416, 418, 420, 422, 424, 426 and 428. The network 400 can be connected to backbone networks as illustrated by links 430 and 432. As is known in the art, a mesh network is a subset of a fully-connected network in which all nodes are connected by direct links and is therefore very reliable. A fully-connected network can be prohibitively expensive, however, when the number of nodes is large. This is due to the need to add N-1 links for the addition of an Nth node. This eventually becomes too expensive and therefore it is common for metropolitan or regional networks to have a mesh topology. In a mesh topology, the number of links is reduced, and some of the signals travel along a ring section while others may have direct links between nodes.

The novel node architecture of the present invention can provide both OMS-SPRING and SNCP for mesh architectures. In FIG. 4, UWB protection for both OMS-SPRING and SNCP protection is illustrated. The MS (multiplex section) Protection wavelengths illustrated on ring 450 represents OMS-SPRING protection which are optically switched to loop back the multiplexed signal to the protection fiber. In one embodiment, this protection is used for the in-band signals described above. The dashed lines 460 and 462 and identified as SNC Protection wavelengths represents the redundant paths provided for a single optical channel. This provides protection in the mesh network for single optical channels, such as the out-band signals previously described. The single optical channel is duplicated on two different routes (e.g., paths 460, 462) to the same destination (e.g., node 410). The destination node decides which one of the two identical signals to use.

Figure 5:
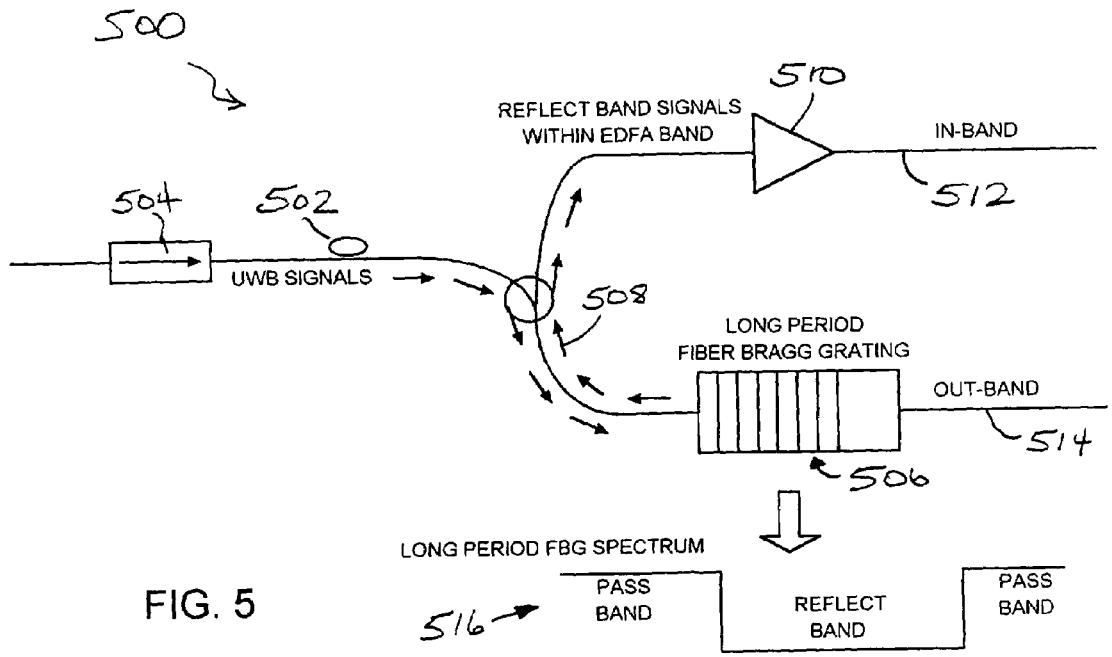
FIG. 5 illustrates one embodiment of a band splitter in accordance with the principles of the present invention.

FIG. 5 illustrates one embodiment of a band splitter 500 in accordance with the principles of the present invention. The example band splitter 500 can be used in connection with the node architecture 200 described in connection with FIG. 2 (i.e., band splitter 220, band splitter 222). An optical UWB signal 502 enters the band splitter 500 in the direction of arrow 504. The band splitter 500 is designed to pass a predetermined band of wavelengths while reflecting a different predetermined band of wavelengths. In one embodiment of the invention, the signals having wavelengths within the EDFA band 106 shown in FIG. 1 are reflected along one transmission path, while the remaining signals having wavelengths outside the EDFA band 106 but within the UWB band 104 are passed through to another transmission path. These two independent transmission paths become the "in-band" and "out-band" signals shown, for example, at the output of the band splitter 220 of FIG. 2.

More particularly, the UWB signals 502 enter the band splitter 500 where they arrive at a fiber Bragg grating (FBG) 506. An FBG is a narrowband mirror that reflects a certain range of wavelengths centered at a particular wavelength known as the Bragg resonance wavelength ($\lambda_B$) which is twice the period of the grating ($\Lambda_b$). The remaining wavelengths are not reflected and pass unaffected through the grating. FBG is typically made by exposing the germania-silica core of an optical fiber to ultraviolet (UV) light, which increases the index of refraction of the fiber at the point of UV exposure. The grating is formed by periodically varying the optical intensity of the UV light applied to the fiber, which creates a periodicity in the induced index of refraction along the length of the fiber. Bragg gratings may be tailored to operate as mirrors, partial reflectors and wavelength filters. In the embodiment of FIG. 5, the FBG is tailored to operate as a long period FBG, which is an FBG that operates as a long period grating (LPG) band rejection filter. In the band splitter 500 application of FIG. 5, the FBG 506 reflects optical signals having wavelengths associated with the EDFA band 106, while passing the optical signals associated with the remaining wavelengths of the UWB band 104.

When the optical signals 502 reach the FBG 506, those signals 502 having wavelengths within the EDFA band 106 are reflected, as illustrated by the signal route in the direction of arrows 508. When reflected by the FBG 506, the reflected signals may optionally be amplified by EDFA 510, and result in the "in-band" signals on line 512, also shown on lines 226 and 227 of FIG. 2. The remaining UWB signals 502 are passed through the FBG 506 to generate the "out-band" signals on line 514, also shown on lines 228 and 229 of FIG. 2. The long period FBG spectrum created by the use of the FBG 506 is generally illustrated by waveform 516.

Figure 6:
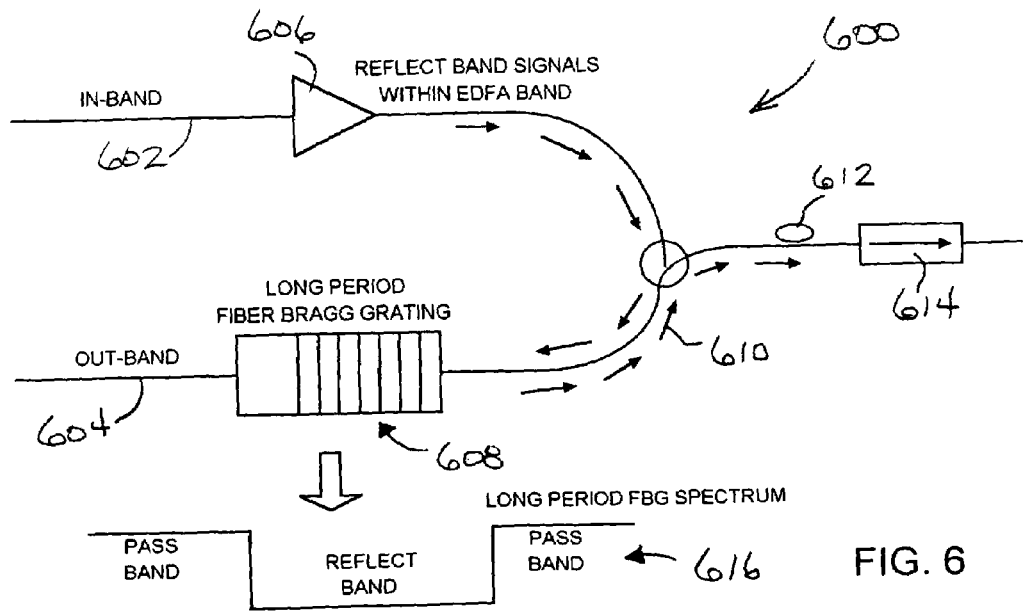
FIG. 6 illustrates one embodiment of a band combiner in accordance with the principles of the present invention.

FIG. 6 illustrates one embodiment of a band combiner 600 in accordance with the principles of the present invention. The example band combiner 600 can be used in connection with the node architecture 200 described in connection with FIG. 2 (i.e., band combiner 240, band splitter 250). The in-band and out-band signals on lines 602, 604 respectively enter the band combiner 600. The in-band signal on line 602 (also depicted on lines 260 and 261 of FIG. 2) is optionally amplified by EDFA 606, and transmitted to the FBG 608. FBG 608 is designed to reflect signals within the EDFA band 106, and does so as indicated by the signal path in the direction of arrows 610. Since the in-band signals on line 602 comprise those signals having wavelengths within the EDFA band 106, essentially all of the in-band signals on line 602 are reflected by the FBG 608 in the direction of arrows 610.

The out-band signal on line 604 (also depicted on lines 262 and 263 of FIG. 2) is transmitted into the opposite side of the FBG 608. The FBG 608 is designed to pass signals within the UWB band 104 but outside of the EDFA band 106. Because the out-band signals on line 604 comprise those signals having wavelengths outside of the EDFA band 106, essentially all of the out-band signals on line 604 are passed through the FBG 608. The out-band signals and the in-band signals are combined into the aggregate UWB signal 612, and collectively exit the band combiner 600 in the direction of arrow 614. The long period FBG spectrum created by the use of the FBG 608 is generally illustrated by waveform 616.

Figure 7:
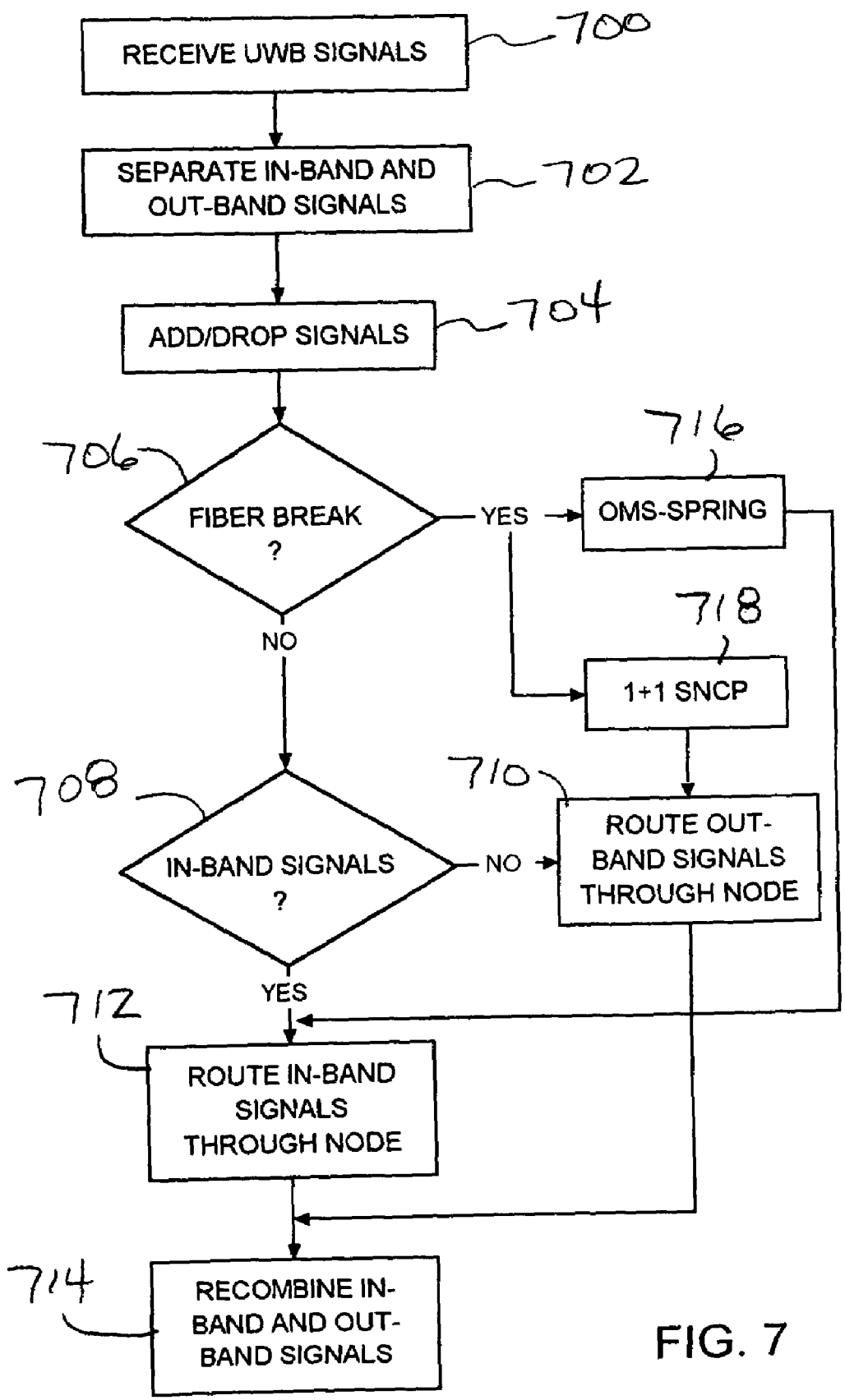
FIG. 7 is a flow diagram illustrating a method of utilizing the full optical transmission spectrum in an optical network in accordance with the principles of the present invention.

FIG. 7 is a flow diagram illustrating a method of utilizing the full optical transmission spectrum in an optical network in accordance with the principles of the present invention. In this embodiment, the ultra-wide band (UWB) signals comprising all of the optical signals are received 700. The in-band and out-band signals are separated 702, such as by using fiber Bragg grating. Signals are added and/or dropped 704 at the node via the add/drop multiplexer where appropriate. At block 706, it is determined whether there is a fiber break or other failure on a particular optical link from the node. If not, where the signals are not in-band signals (i.e., out-band signals) as determined at block 708, the out-band signals are routed 710 through the node. The signals that are in-band signals are also routed 712 through the node. The in-band and out-band signals are then combined 714 prior to being transmitted from the node.

In one embodiment of the invention, where a fiber break occurs as determined at decision block 706, OMS-SPRING protection 716 is used to ensure proper transmission of the in-band signals. OMS-SPRING protection results in signals being routed 712 through the node, but they will be switched onto ring protection fibers. Similarly, out-band signals will also be protected, and in one embodiment of the invention this is effected using 1+1 SNCP as shown at block 718. The duplicate out-band optical signals resulting from the 1+1 SNCP are routed 710 through the node on both working fibers, however the optical signals will only reach the receiving node on one of the working fibers where there has been a working fiber break. The in-band signals will be routed through the network until switched back onto a working fiber and provided to the receiving node, and the out-band signals will be routed directly to the receiving node via the available working fiber. Signals will be received and appropriately cross-connected at the receiving node, and recombined 714.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

I claim:

1. A network node circuit for use in wavelength division multiplexing (WDM) optical networks to allow utilization of a wide optical communication band, the node circuit comprising:

a band splitter having an input to receive a plurality of optical signals sent on a corresponding plurality of wavelengths of an optical communication band, and to separate a first plurality of the optical signals within a first wavelength range within an amplification band of the optical communication band from a second plurality of the optical signals within a second wavelength range outside the amplification band of the optical communication band;

a cross-connect circuit having input ports to receive the first and second pluralities of the optical signals and to route the first and second pluralities of the optical signals over different protection paths through the cross-connect circuit to targeted output ports; and a band combiner coupled to the cross-connect circuit to receive the first and second pluralities of the optical signals, and to combine the first and second pluralities of the optical signals into an aggregate plurality of optical signals for transmission from the network node.

2. The node circuit as in claim 1, wherein the first wavelength range corresponds to a range of wavelengths capable of being optically amplified.

3. The node circuit as in claim 2, wherein the range of wavelengths capable of being optically amplified corresponds to a range of wavelengths capable of being amplified by erbium-doped fiber amplifiers.

4. The node circuit as in claim 2, wherein the second wavelength range corresponds to the wavelengths outside of the first range of wavelengths.

5. The node circuit as in claim 4, wherein the second wavelength range is not contiguous and comprises wavelength ranges on both sides of the first wavelength range.

6. The node circuit as in claim 1, wherein the wide optical communication band is in a low attenuation region of an optical transmission spectrum comprising wavelengths from approximately 1240 nanometers to approximately 1610 nanometers.

7. The node circuit as in claim 1, further comprising optical amplifiers coupled to the band splitter to receive and optically amplify the optical signals within the first wavelength range.

8. The node circuit as in claim 7, wherein the optical amplifiers comprise erbium-doped fiber amplifiers.

9. A network node circuit for use in wavelength division multiplexing (WDM) optical networks to allow utilization of a wide optical communication band, the node circuit comprising:
   a band splitter having an input to receive a plurality of optical signals sent on a corresponding plurality of wavelengths of an optical communication band, and to separate a first plurality of the optical signals within a first wavelength range within an amplification band of the optical communication band from a second plurality of the optical signals within a second wavelength range outside the amplification band of the optical communication band;
   a cross-connect circuit having input ports to receive the first and second pluralities of the optical signals and to route the first and second pluralities of the optical signals through the cross-connect circuit to targeted output ports;
   a band combiner coupled to the cross-connect circuit to receive the first and second pluralities of the optical signals, and to combine the first and second pluralities of the optical signals into an aggregate plurality of optical signals for transmission from the network node; and
   OMS-SPRING protection fibers for the optical signals within the first wavelength range.

10. The node circuit as in claim 9, further comprising protection switching circuitry coupled to the cross-connect circuit to collectively switch the optical signals within the first wavelength range to protection fibers, in the event of a failure of a working fiber upon which the optical signals within the first wavelength range are being transmitted.

11. A network node circuit for use in wavelength division multiplexing (WDM) optical networks to allow utilization of a wide optical communication band, the node circuit comprising:
   a band splitter having an input to receive a plurality of optical signals sent on a corresponding plurality of wavelengths of an optical communication band, and to separate a first plurality of the optical signals within a first wavelength range within an amplification band of the optical communication band from a second plurality of the optical signals within a second wavelength range outside the amplification band of the optical communication band;
   a cross-connect circuit having input ports to receive the first and second pluralities of the optical signals and to route the first and second pluralities of the optical signals through the cross-connect circuit to targeted output ports;
   a band combiner coupled to the cross-connect circuit to receive the first and second pluralities of the optical signals, and to combine the first and second pluralities of the optical signals into an aggregate plurality of optical signals for transmission from the network node; and
   a linear protection circuit for the optical signals within the second wavelength range.

12. The node circuit as in claim 11, wherein the linear protection circuit comprises a 1+1 linear protection circuit.

13. A network node circuit for use in wavelength division multiplexing (WDM) optical networks to allow utilization of a wide optical communication band, the node circuit comprising:
   a band splitter having an input to receive a plurality of optical signals sent on a corresponding plurality of wavelengths of an optical communication band, and to separate a first plurality of the optical signals within a first wavelength range of the optical communication band from a second plurality of the optical signals within a second wavelength range of the optical communication band;
   a cross-connect circuit having input ports to receive the first and second pluralities of the optical signals and to route the first and second pluralities of the optical signals through the cross-connect circuit to targeted output ports;
   a band combiner coupled to the cross-connect circuit to receive the first and second pluralities of the optical signals, and to combine the first and second pluralities of the optical signals into an aggregate plurality of optical signals for transmission from the network node; and
   a linear protection circuit for the optical signals within the second wavelength range,
   wherein the linear protection circuit comprises a signal duplicator for each of the optical signals within the second wavelength range to respectively transmit each of a duplicated set of the optical signals within the second wavelength range onto each of two working fibers supplied to the network by the node circuit.

14. The node circuit as in claim 13, wherein each of the duplicated sets of the optical signals within the second wavelength range are transmitted on different wavelengths from one another.

15. The node circuit as in claim 13, wherein each of the duplicated sets of the optical signals within the second wavelength range are transmitted on a common wavelength.

16. The node circuit as in claim 1, wherein the band splitter comprises a long period fiber Bragg grating having a Bragg resonance wavelength band substantially equal to the first wavelength range to reflect the optical signals within the first wavelength range onto a first signal path, while allowing the optical signals within the second wavelength range to pass through to a second signal path.

17. The node circuit as in claim 1, wherein the band combiner comprises a long period fiber Bragg grating having a Bragg resonance wavelength band substantially equal to the first wavelength range to reflect the optical signals within the first wavelength range, while allowing the optical signals within the second wavelength range to pass through the long period fiber Bragg grating, wherein the reflected optical signals within the first wavelength range and the passed optical signals within the second wavelength range are collectively combined on a common signal path to provide the aggregate plurality of optical signals for transmission from the network node.

18. The node circuit as in claim 1, wherein the cross-connect circuit is an optical cross-connect circuit.

19. The node circuit as in claim 1, further comprising an optical add/drop multiplexer to selectively add additional optical signals to the first and second plurality of optical signals within the first and second wavelength ranges respectively, and to selectively drop selected ones of the first and second plurality of optical signals within the first and second wavelength ranges respectively.

20. A network node circuit for use in wavelength division multiplexing (WDM) optical networks to allow utilization of a wide optical communication band, the node circuit comprising:
   band splitting means for receiving a plurality of optical signals sent on
   wavelengths within the wide optical communication band, and for separating in-band signals corresponding to wavelengths within an erbium-doped fiber amplification (EDFA) band from out-band signals corresponding to wavelengths outside of the EDFA band;
   means for routing the in-band and out-band signals node to targeted in-band and out-band output ports respectively;
   first protection means for rerouting the in-band signals through the optical network upon detection of a link failure associated with the targeted in-band output port;
   second protection means for supplying redundant transmission paths for the out-band signals through the optical network upon detection of a link failure associated with the targeted out-band output port; and
   band combination means for receiving the in-band and the out-band signals, and for combining the in-band and the out-band signals into an aggregation of optical signals for transmission from the network node.

21. A method for fully utilizing an optical spectrum spanning a predefined low attenuation region of an optical transmission spectrum, for communicating information on optical fibers of an optical network, the method comprising:
   separating optical signals within the predefined low-attenuation region into in-band and out-band optical signals, wherein the in-band signals substantially correspond to a first wavelength range within the predefined low-attenuation region designated for optical amplification, and wherein the out-band signals substantially correspond to a second wavelength range within the predefined low-attenuation region and exclusive of the first wavelength range;
   routing the in-band and out-band optical signals over different protection paths to in-band and out-band output ports associated with destination nodes for the in-band and out-band signals respectively; and
   combining the in-band and out-band optical signals from the in-band and out-band output ports to provide a united collection of the optical signals for collective transmission.

22. A method for fully utilizing an optical spectrum spanning a predefined low attenuation region of an optical transmission spectrum, for communicating information on optical fibers of an optical network, the method comprising:
   separating optical signals within the predefined low-attenuation region into in-band and out-band optical signals, wherein the in-band signals substantially correspond to a first wavelength range within the predefined low-attenuation region designated for optical amplification, and wherein the out-band signals substantially correspond to a second wavelength range within the predefined low-attenuation region and exclusive of the first wavelength range;
   routing the in-band and out-band optical signals to in-band and out-band output ports associated with destination nodes for the in-band and out-band signals respectively;
   combining the in-band and out-band optical signals from the in-band and out-band output ports to provide a united collection of the optical signals for collective transmission; and
   collectively switching all of the in-band signals from the optical fibers to optical protection fibers upon recognition of a failure of one or more of the optical fibers.

23. The method of claim 22, wherein collectively switching all of the in-band signals to optical protection fibers comprises collectively rerouting all of the in-band signals from the optical fibers to the optical protection fibers using OMS-SPRING protection.

24. A method for fully utilizing an optical spectrum spanning a predefined low attenuation region of an optical transmission spectrum, for communicating information on optical fibers of an optical network, the method comprising:
   separating optical signals within the predefined low-attenuation region into in-band and out-band optical signals, wherein the in-band signals substantially correspond to a first wavelength range within the predefined low-attenuation region designated for optical amplification, and wherein the out-band signals substantially correspond to a second wavelength range within the predefined low-attenuation region and exclusive of the first wavelength range;
   routing the in-band and out-band optical signals to in-band and out-band output ports associated with destination nodes for the in-band and out-band signals respectively;
   combining the in-band and out-band optical signals from the in-band and out-band output ports to provide a united collection of the optical signals for collective transmission; and
   separately duplicating each of the out-band signals, and transmitting each of the duplicate out-band signals on separate optical fibers of the network to provide redundancy.

25. The method of claim 24, further comprising selecting one of the duplicate out-band signals and disregarding the other duplicate out-band signals at a targeted node of the optical network.

26. The method of claim 24, further comprising receiving one of the duplicate out-band signals upon a failure of the optical fiber providing the other duplicate out-band signals.

27. The method of claim 24, wherein transmitting each of the duplicate out-band signals on separate optical fibers comprises providing optical channel protection using 1+1 sub-network connection protection (SNCP).

28. The method of claim 21, wherein separating optical signals into in-band and out-band optical signals comprises:

reflecting the optical signals within the first wavelength range onto a first signal path; and passing the optical signals within the second wavelength range onto a second signal path.

29. The method of claim 28, wherein:

reflecting the optical signals comprises directing the optical signals into a fiber Bragg grating having a reflection wavelength band substantially equal to the first wavelength range; and passing the optical signals comprises directing the optical signals into the fiber Bragg grating having a passband substantially equal to the second wavelength range.

30. The method of claim 21, wherein combining the in-band and the out-band optical signals comprises:

reflecting the in-band signals from a first signal path onto a collective signal path; and passing the out-band signals from a second signal path onto the collective signal path.

31. The method of claim 30, wherein:

reflecting the in-band signals comprises directing the in-band signals into a fiber Bragg grating having a reflection wavelength band substantially equal to the first wavelength range; and passing the out-band signals comprises directing the out-band signals into the fiber Bragg grating having a passband substantially equal to the second wavelength range.

32. A bi-directional optical network for communicating information in a predefined low-attenuation region of an optical transmission spectrum, comprising:

a pair of working optical fibers configured in a ring, each of the working fibers for transmitting the optical signals of the optical transmission spectrum in opposite directions;

a pair of ring protection fibers configured in a ring, each of the ring protection fibers associated with one of the working fibers for transmitting the optical signals of its corresponding working optical fiber upon a failure of its corresponding working optical fiber;

a plurality of network nodes each interposed along the rings of working optical fibers and the ring protection fibers to produce a ring network topology, each of the network nodes comprising:

(a) a band splitter having an input to receive a plurality of optical signals sent on a corresponding plurality of wavelengths of an optical communication band, and to separate a first plurality of the optical signals within a first wavelength range within an amplification band of the optical communication band from a second plurality of the optical signals within a second wavelength range outside the amplification band of the optical communication band;

(b) a cross-connect circuit having input ports to receive the first and second pluralities of the optical signals and to route the first and second pluralities of the optical signals through the cross-connect circuit to targeted output ports; and (c) a band combiner coupled to the cross-connect circuit to receive the first and second pluralities of the optical signals, and to combine the first and second pluralities of the optical signals into an aggregate plurality of optical signals for transmission from the network node; and a ring protection circuit coupled to the band splitter to switch the first plurality of optical signals from the working optical fiber to an associated ring protection fiber upon recognition of the failure of its corresponding working optical fiber.

33. A bi-directional optical network for communicating information in a predefined low-attenuation region of an optical transmission spectrum, comprising:

a pair of working optical fibers configured in a ring, each of the working fibers for transmitting the optical signals of the optical transmission spectrum in opposite directions;

a pair of ring protection fibers configured in a ring, each of the ring protection fibers associated with one of the working fibers for transmitting the optical signals of its corresponding working optical fiber upon a failure of its corresponding working optical fiber;

a plurality of network nodes each interposed along the rings of working optical fibers and the ring protection fibers to produce a ring network topology, each of the network nodes comprising:

(a) a band splitter having an input to receive a plurality of optical signals sent on a corresponding plurality of wavelengths of an optical communication band, and to separate a first plurality of the optical signals within a first wavelength range of the optical communication band from a second plurality of the optical signals within a second wavelength range of the optical communication band;

(b) a cross-connect circuit having input ports to receive the first and second pluralities of the optical signals and to route the first and second pluralities of the optical signals through the cross-connect circuit to targeted output ports; and (c) a band combiner coupled to the cross-connect circuit to receive the first and second pluralities of the optical signals, and to combine the first and second pluralities of the optical signals into an aggregate plurality of optical signals for transmission from the network node;

a ring protection circuit coupled to the band splitter to switch the first plurality of optical signals from the working optical fiber to an associated ring protection fiber upon recognition of the failure of its corresponding working optical fiber; and a signal duplication circuit coupled to the band splitter to duplicate each of the second plurality of optical signals and to transmit a first of the duplicate signals on a first of the pair of working fibers and a second of the duplicate signals on a second of the pair of working fibers.

* * * * *